United States Patent [19]

Iwai

[11] Patent Number: 4,692,022

[45] Date of Patent: Sep. 8, 1987

[54] AUTOMATIC DUPLEX COPYING MACHINE AND METHOD OF TREATING PAPER JAMMING THEREFOR

[75] Inventor: Shiyougo Iwai, Yamatokoriyama, Japan

[73] Assignee: Sharp Kabushiki Kaisha, Osaka, Japan

[21] Appl. No.: 846,957

[22] Filed: Apr. 1, 1986

[30] Foreign Application Priority Data

Apr. 17, 1985 [JP] Japan .................................. 60-82045
May 17, 1985 [JP] Japan ................................ 60-106255

[51] Int. Cl.[4] ........................ G03B 27/32; G03B 27/52
[52] U.S. Cl. .................................. 355/24; 355/14 SH
[58] Field of Search .................... 355/3 SH, 14 SH, 24

[56] References Cited

U.S. PATENT DOCUMENTS 4,272,180 6/1981 Satomi et al. ....................... 355/244

*Primary Examiner*—Richard A. Wintercorn
*Attorney, Agent, or Firm*—Birch, Stewart, Kolasch & Birch

[57] ABSTRACT

An automatic duplex copying machine having a function for forming images on both sides of a copy paper sheet through a process in which a one-side copied paper sheet is once stored in an intermediate tray and is again led to a copying process portion after having been reversed in its transporting direction. The automatic duplex copying machine of the above described type is provided with a one-side copied paper change-over member for leading the one-side copied paper sheet towards either an intermediate tray or an intermediate sub-tray during a double-side copying operation, and a one-side copied paper selecting member for selectively supplying a one-side copied paper sheet, during a copying operation for the reverse side thereof, to the copying process portion from the intermediate tray when no paper exists in the intermediate sub-tray or from the intermediate sub-tray when papers exist therein, with one or more intermediate sub-trays being arranged in the vicinity of the intermediate tray.

3 Claims, 7 Drawing Figures

AUTOMATIC DUPLEX COPYING MACHINE AND METHOD OF TREATING PAPER JAMMING THEREFOR

BACKGROUND OF THE INVENTION

The present invention generally relates to a copying machine and more particularly, to an automatic double-side or duplex copying machine (referred to as a duplex copying machine hereinafter) capable of automatically forming images on both sides of a copy paper sheet and provided with a circulatory document feeder which is capable of circularly transporting each of a plurality of original documents placed on an original tray to an original platform. The present invention also relates to a method of treating a paper clogging i.e. a paper jamming which has taken place in reverse-side copying operation wherein a copying operation is carried out on a blank reverse side of a one-side copied paper sheet during an automatic double-side copying operation, with the automatic duplex copying machine also being intended for use in an interruption mode thereof.

A known automatic duplex copying machine is provided with a switch-back transport passage and one or more intermediate storing locations for one-side copied paper sheets between a paper discharging portion and a copying process portion, whereby each of one-side copied paper sheets is led to the switch-back transport passage so that its transporting direction is turned the other way and thereafter, each of them is temporarily stored in the intermediate storing portion. After an original on the original platform has been replaced by a next original which is to be copied on the blank reverse side of a one-side copied paper sheet, the one-side copied paper sheet in the intermediate storing portion is transported to the copying process portion so that an image is also formed on the reverse side thereof which is caused to face the surface of a photosensitive member.

Furthermore, there have conventionally been such an automatic duplex copying machine which is provided with an automatic document feeder for supplying and discharging each original to and from the original platform in order to simplify the replacing of originals during the automatic double-side copying operation, and another automatic duplex copying machine which is provided with a sorter in a paper discharging portion thereof in order to simplify the adjusting required for originals during the double-side copying operation for a plurality of originals having consecutive pages, each of which copying machines is commercially available nowadays.

In the automatic document feeder for automatically supplying and discharging mainly one-sided originals each having an image on one side thereof, there is generally known a circulatory document feeder which is capable of transporting each of a plurality of originals placed on the original tray to the original platform in the order from the lowest one, and discharging the original on the original platform onto the uppermost one of the originals placed on the original tray.

There has also been conventionally proposed a method of conducting the automatic double-side copying operation by employing the automatic duplex copying machine having the aforementioned circulatory document feeder and sorter, wherein a copying operation is carried out on each odd page of originals during the first circulation thereof in the circulatory document feeder, and each of one-side copied paper sheets according to the above described process is stored in an intermediate tray. During the following second circulation of the originals, each of one-side copied paper sheets is supplied from the intermediate tray only for the originals of even pages so that the original on the original platform is copied on the blank reverse side of a one-side copied paper sheet. According to the above described method, since only one alteration from one-side copying operation to the reverse-side copying operation is only required irrespective of the number of originals, the copying machine is desirably decreased in wear and failure thereof. In the automatic double-side copying operation, however, the paper transport passage is remarkably complicated and prolonged, and the paper is easily distorted with being heated and pressed by fixing rollers in a copying operation for one side thereof. Accordingly, in the automatic double-side copying operation, particularly, in the copying operation for the reverse side of a copy paper sheet, since failures are liable to arise in supplying or transporting the paper, a paper jamming sometimes takes place in the paper transport passage. When the paper jamming has taken place in the copying operation for one side of the copy paper sheet, the paper which is brought to a standstill in the transport passage is removed therefrom and upon release of the paper jamming, the automatic double-side copying operation can be continued by repeating the copying operation for the insufficient number of copied paper sheets. On the contrary, when the jamming has taken place in the copying operation for the reverse side of one-side copied paper sheet, it is necessary to carry out not only the copying operation for the reverse side thereof, but also the same operation for the front side thereof again.

Conventionally, there is no such automatic duplex copying machine whereby the copying operation can be easily carried out on the front side of copy paper sheet for an insufficient number of copy paper sheets in a case where the jamming has taken place in the copying operation for the reverse side of one-side copied paper sheet. In particular, in an automatic duplex copying machine whereby the one-side copied paper sheet is transported to the copying process portion in the order from the lowest one to the upper on the intermediate storing portion, it is required to carry out the double-side copying operation with respect to the original which has been subjected to the jamming, after all of the reverse-side copying operations have been completed. Therefore, in case of double-side copying operation on the originals having consecutive pages, adjustment of the copies after the copying operation becomes extremely complicated. Particularly, there have been such drawbacks that in a copying machine having a sorter thereon, its function can not be effectively utilized, and in another copying machine having a document feeder thereon, replacement of the originals becomes complicated. Furthermore, each copying machine of the above described type also has the drawback that during the double-side copying operation for a plurality of originals, since a copying operation for the other originals is not allowed to be carried out in an interruption mode, the copying machine can not treat a copying operation which is an emergency.

SUMMARY OF THE INVENTION

Accordingly, an essential object of the present invention is to provide an improved automatic duplex copying machine having a circulatory document feeder which is capable of easily and continuously carrying out the automatic double-side copying operation the before case, even in case where a jamming has taken place in a copying operation for the reverse side of one-side copied paper sheet during automatic double-side copying operation and thereby the automatic double-side copying operation is substantially simplified and the automatic duplex copying machine can therefore be remarkably improved in working efficiency.

Another object of the present invention is to provide an automatic duplex copying machine of the above described type which is capable of easily carrying out the copying operation for replenishing insufficient number of copied paper sheet caused by a jamming which has taken place during another automatic double-side copying operation in an interruption mode in the course of an automatic double-side copying operation.

In accomplishing these and other objects, according to one preferred embodiment of the present invention, there is provided an automatic duplex copying machine having a function for forming images on both sides of a copy paper sheet through a process in which a one-side copied paper sheet is once stored in an intermediate tray and is again led to a copying process portion after having been reversed in its transporting direction. The automatic duplex copying machine of the above described type is provided with a one-side copied paper change-over means for leading the one-side copied paper sheet towards either an intermediate tray or an intermediate sub-tray during double-side copying operation, and a one-side copied paper selecting means for selectively supplying the one-side copied paper sheet, during a copying operation for the reverse side thereof, to the copying process portion from the intermediate tray in a case where no paper exists in the intermediate sub-tray or from the intermediate sub-tray in a case where papers exist therein, with one or more intermediate sub-trays being arranged in the vicinity of the intermediate tray.

By the above construction of the present invention, in the case where another double-side copying operation is carried out in the interruption mode, during an automatic double-side copying operation, or where an additional double-side copying operation is carried out for replenishing an insufficient number of copied paper sheets on which a jamming has taken place during copying operation for the reverse side thereof, the one-side copied paper sheet is selectively transported towards the intermediate sub-tray by a one-side copied paper change-over means thus resulting in that the aforementioned one-side copied paper sheet is desirably prevented from entering into one-side copied paper sheets according to another double-side copying operation at a standstill. Upon alteration of the original, the one-side copied paper sheet in connection with either of the above described cases and stored in the intermediate sub-tray, is supplied to the copying process portion by the one-side copied paper selecting means. Accordingly, another double-side copying operation in the interruption mode can be carried out during the automatic double-side copying operation. Furthermore, where a jamming has taken place in the copying operation for the reverse side of a one-side copied paper sheet, an additional double-side copying operation can be immediately carried out by replenishing an insufficient number of copied paper sheets and this desirably facilitates the copy adjustment in double-side copying operation for an in plurality of originals having consecutive pages. In particular, where a jamming has taken place during the adjustment of copied paper sheets according to the automatic double-side copying operation by using a sorter, the function of the automatic duplex copying machine of the present invention can be effectively utilized.

In another aspect of the present invention, there is provided a method for treating a jamming during reverse-side copying operation for one-side copied paper sheets in a double-side copying process of an automatic duplex copying machine wherein a copying operation is carried out on each of the originals having odd pages during the first circulation of a plurality of one-sided originals placed on an original tray of a circulatory document feeder and each of the originals having even pages is copied on the reverse side of each one-side copied paper sheet during the second circulation of the originals, with each of the one-side copied paper sheets being once stored in an intermediate sub-tray. In the above described method, a copying operation is carried out for an insufficient number of copied paper sheets by supplying copy paper sheets from a paper supplying portion with respect to the original having an even page placed on the original platform which is to be copied on the reverse side of a one-side copied paper sheet. Subsequently, after each one-side, that is, reverse-side copied paper sheet has been once stored in the intermediate sub-tray, the reverse-side copied paper sheet is supplied therefrom with respect to the original having an odd page which is subsequently transported from the original tray for a front-side copying operation on the reverse-side copied paper sheet so that a copying operation is carried out on the front side of the reverse-side copied paper sheet. The above described method of the present invention is originated from the fact that the originals are placed one upon another in a regular order on the original tray of the circulatory document feeder.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
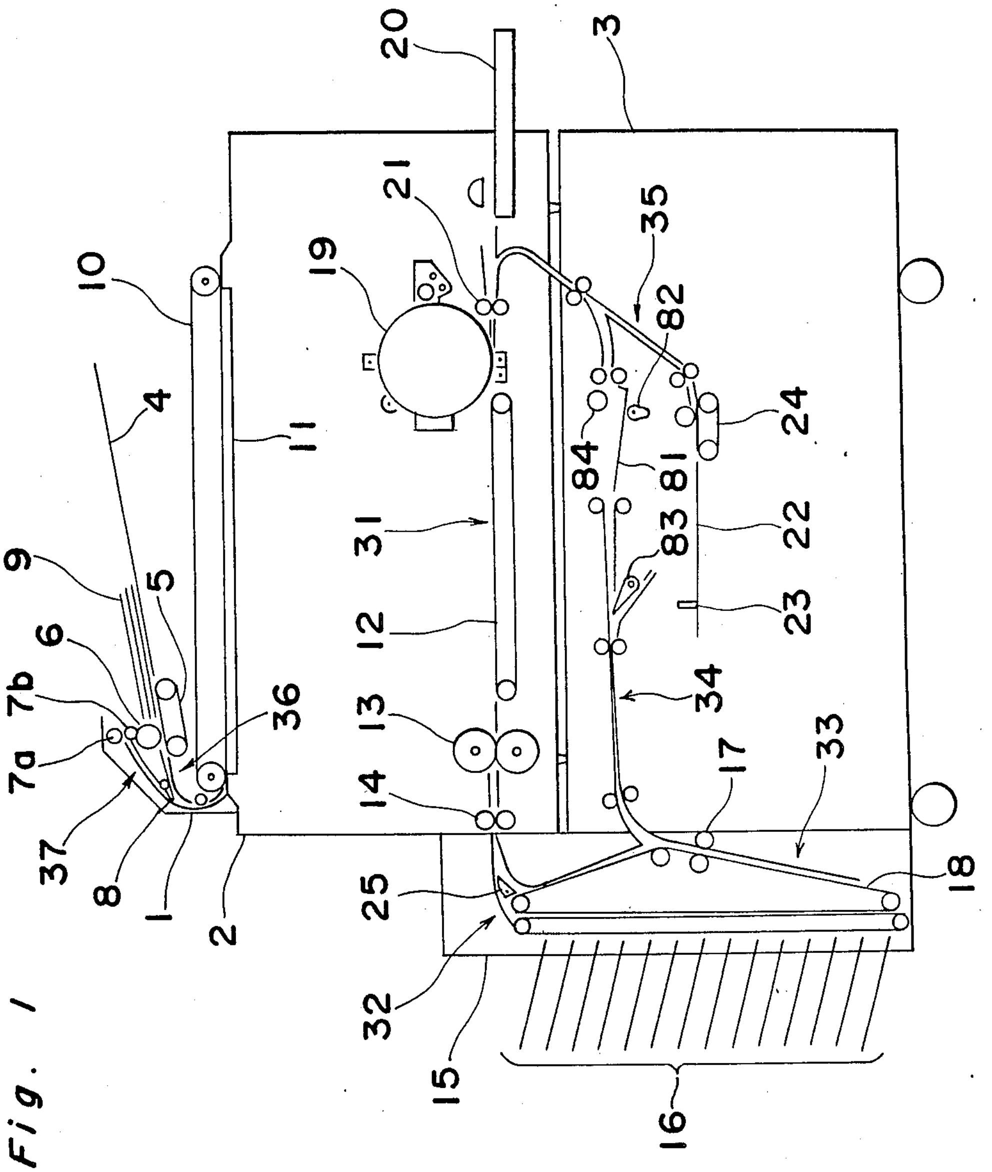
FIG. 1 is a sectional view schematically showing the whole construction of an automatic duplex copying machine according to one preferred embodiment of the present invention.

Before the description of the present invention proceeds, it is to be noted that like parts are designated by like reference numerals throughout the accompanying drawings.

Referring now to the drawings, there is schematically shown in FIG. 1, the whole construction of the automatic duplex copying machine according to one preferred embodiment of the present invention.

In FIG. 1, the copying machine generally includes a main body 2 placed on a cabinet 3, and a photosensitive or photoreceptor drum 19 rotatably provided at a lower right portion of the main body 2 to constitute a copying process portion. A paper feed cassette 20 is detachably arranged in a paper supplying portion on the right-hand surface of the copying machine body 2 and a pair of paper supplying rollers 21 are disposed between the paper supplying portion and the copying process portion for supplying a copy paper sheet to the copying process portion during rotation of the photosensitive drum 19. There are arranged a paper transporting belt 12, a pair of fixing rollers 13 and a pair of paper discharging rollers 14 at the downstream side of the photosensitive drum 19 so as to compose a paper transport passage.

On the left-side surface of the copying machine body 2, there is disposed a sorter 15 wherein another paper transporting belt 18 movable in both directions is accommodated. A plurality of bin stages 16 are placed one upon another on the left side of the sorter 15 for receiving copied paper sheets which are discharged by the paper discharging rollers 14 inside of the copying machine body 2 through a paper transport passage 32 inside of the sorter 15. A pair of switch-back rollers 17 are arranged on the cabinet side of the paper transporting belt 18 inside of the sorter 15 so as to provide a switch-back transport passage 33. In a double-side copying operation, upon movement of a paper change-over claw member 25, each of a plurality of one-side copied paper sheets is transported to the switch-back transport passage 33 and thereafter, into the cabinet 3, with the transporting direction thereof being turned the other way. Furthermore, each of double-side copied paper sheets is also led to the switch-back transport passage 33 and is stored in the bin 16 by being turned upside down.

There are provided an intermediate tray 22 and an intermediate sub-tray 81 inside of the cabinet 3, and a transport passage 34 for double-side copying operation is disposed between these trays 22, 81 and the switch-back transport passage 33. In addition, a reversed paper transport passage 35 is arranged between the above described trays 22, 81 and the paper supplying rollers 21 inside of the copying machine body 2. The intermediate tray 22 is provided with a paper guide 23 for setting the position of the paper sheet to be stored thereon and a paper supplying belt 24 for supplying each of the paper sheets stored thereon one after another from the lower side in a direction towards the reversed paper transport passage 35. The intermediate sub-tray 81 is freely rotatable by being pivotally arranged on the side of the transport passage 34 for the double-side copying operation, while being in contact with a cam roller 82 at a bottom end surface thereof on the side of the reversed paper transport passage 35. Where paper sheets are supplied from the intermediate sub-tray 81, upon rotation of the cam roller 82, the intermediate sub-tray 81 moves upwardly on the side of the reversed paper transport passage 35. According to such a movement of the intermediate sub-tray 81, each paper sheet stored thereon is caused to contact with a paper supplying roller 84 of the intermediate sub-tray portion, resulting in that the paper sheets on the intermediate sub-tray are supplied one after another in a direction towards the reversed paper transport passage 35. There is rotatably arranged a one-side copied paper change-over claw member 83 at a portion of the transport passage 34 for the double-side copying operation and this claw member 83 is a change-over means of the present invention for leading each of one-side copied paper sheets towards either intermediate tray 22 or intermediate sub-tray 81.

A circulatory document feeder 1 is mounted on an original platform 11 arranged on the upper surface of the copying machine body 2. The circulator document feeder 1 is internally provided with an original supplying belt 5, an original supplying roller 6, a pair of original discharging rollers *7a*, *7b* and an original change-over claw member 8. An original tray 4 is arranged between the original supplying belt 5 and the original supplying roller 6. Originals 9 placed on the original tray 4 are supplied one after another from the lower side. An original transporting belt 10 is mounted on the original platform 11 so as to transport the originals 9 which are supplied by the original supplying belt 5 and the original supplying roller 6 through an original transport passage 36, to a required position of the original platform 11. When the originals 9 are supplied from the original tray 4, the original change-over claw member 8 is in a state which is shown in FIG. 1, resulting in that the original transport passage 36 is opened. When the original 9 on the original platform 11 is recovered, the original change-over claw member 8 is rotated downwardly so as to open the original recovering passage 37. The original transporting belt 10 is capable of rotating in both directions not only for transporting each of the originals onto the original platform 11, but also for discharging each original onto the originals placed thereon.

Figure 2:
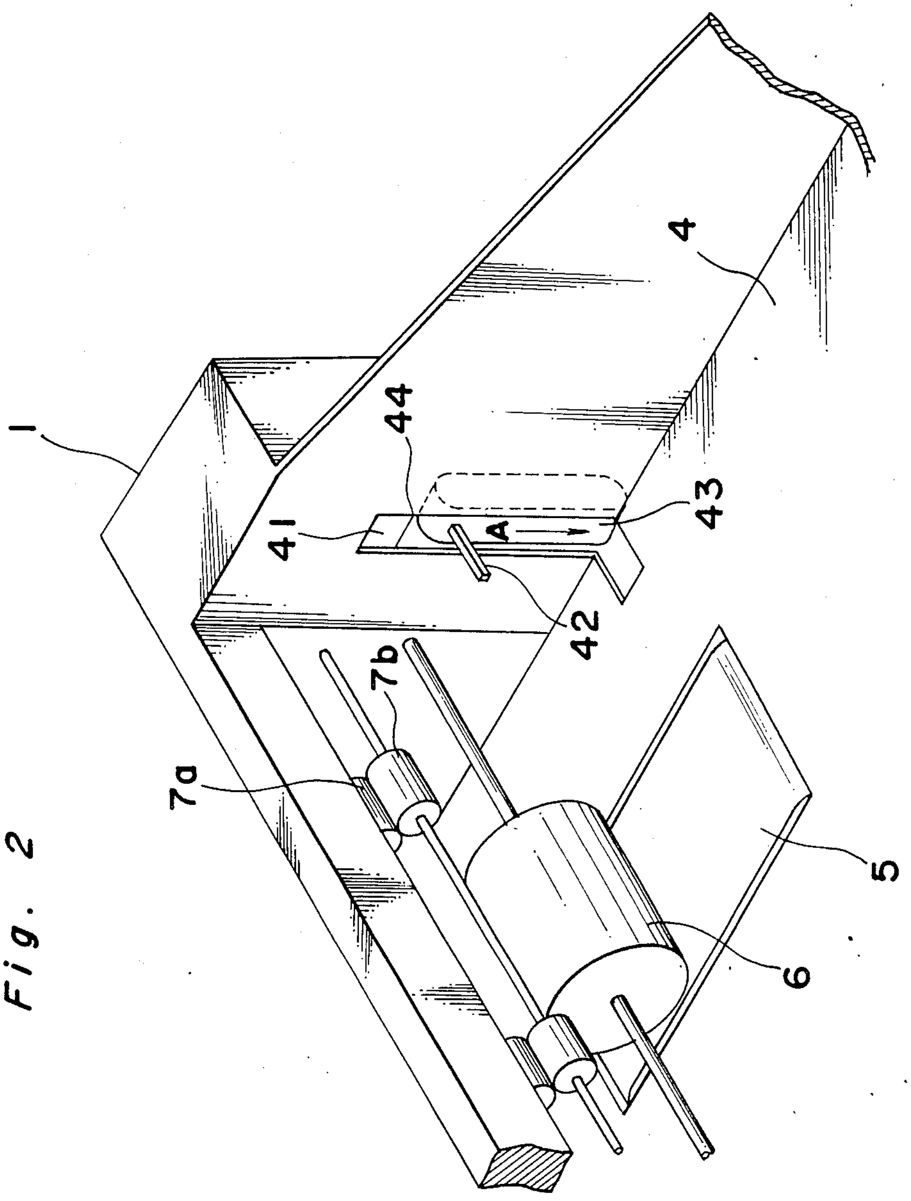
FIG. 2 is a fragmentary perspective view, on an enlarged scale, in the vicinity of an original tray of a circulatory document feeder mounted on the automatic duplex copying machine of FIG. 1; and FIGS. *3a* through *3e* are flow-charts for explaining functions of the copying machine of FIG. 1.
Figure 3A:
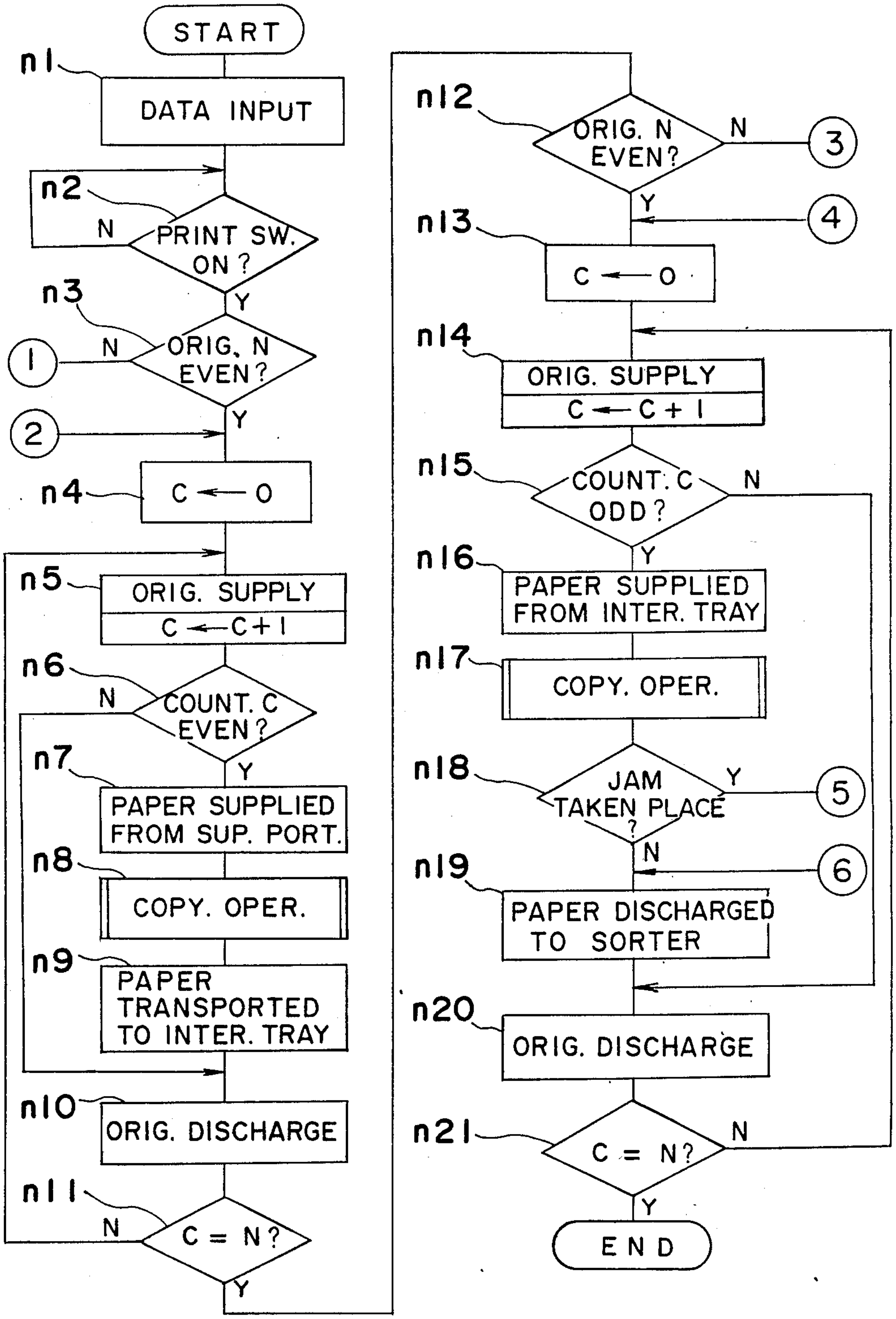
Figure 3B:
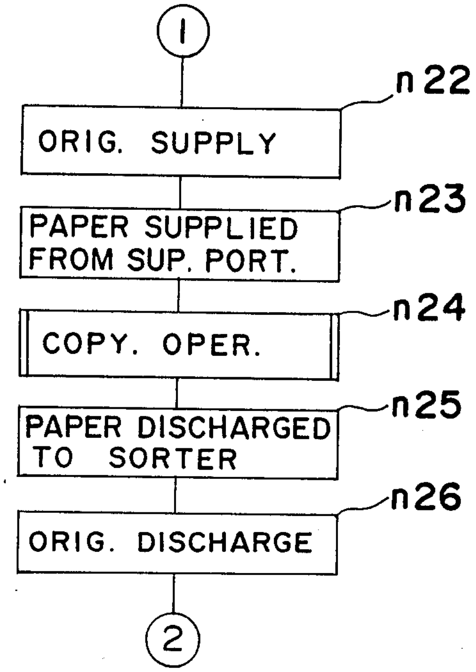
Figure 3C:
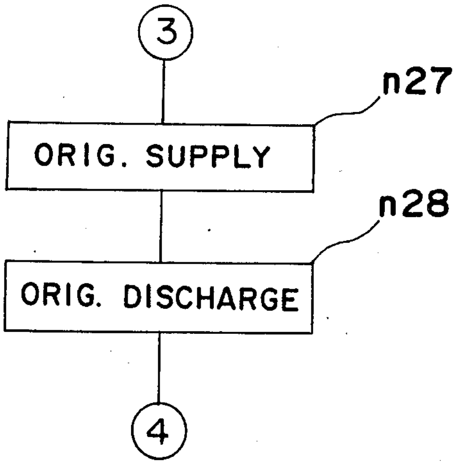
Figure 3D:
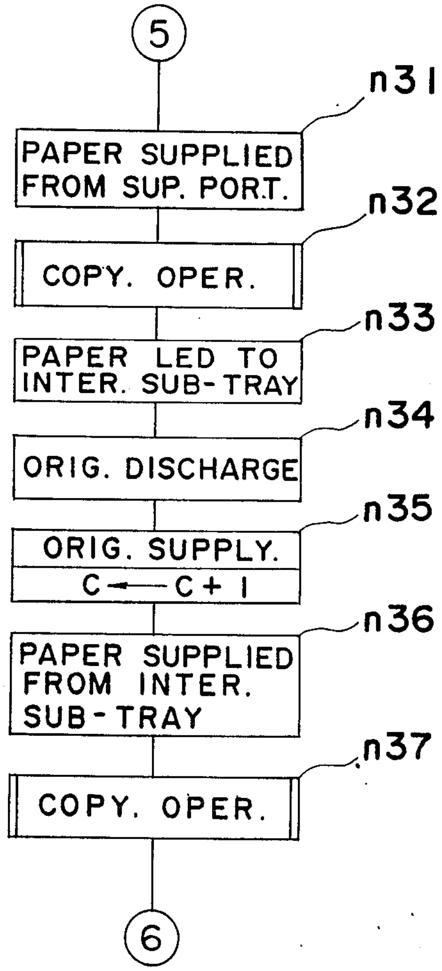
Figure 3E:
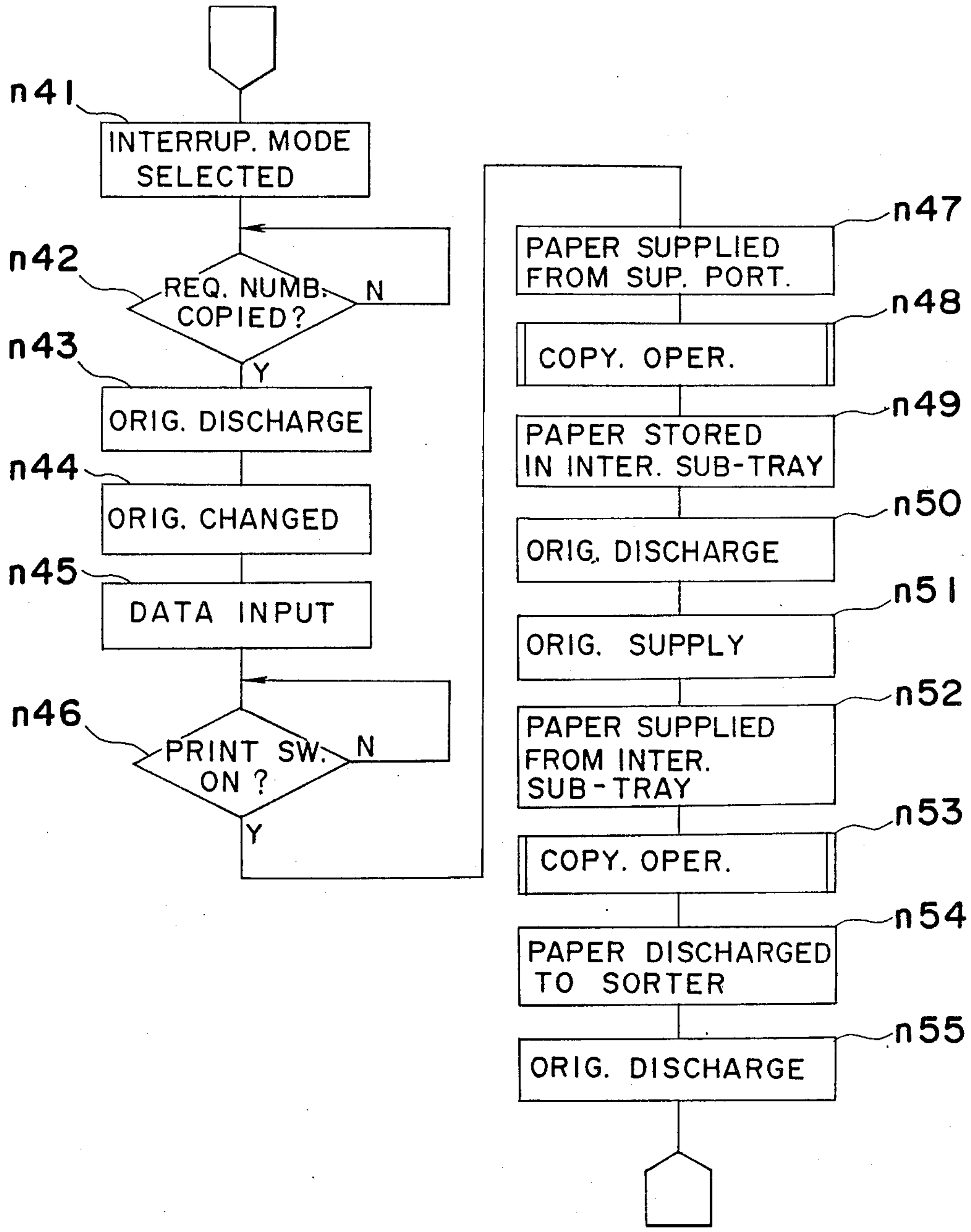

FIG. 2 shows a perspective view of the circulatory document feeder 1 in the vicinity of the original tray 4, the circulatory document feeder 1 being mounted on the above described automatic duplex copying machine.

The original tray 4 is disposed between the original supplying belt 5 and the original supplying roller 6 of the circulatory document feeder 1, and pairs of original discharging rollers *7a*, *7b* are arranged above and on respective sides of the original supplying roller 6. Originals 9 placed on the original tray 4 are supplied by the original supplying belt 5 and the original supplying roller 6 in order from the lower original to the upper original. Furthermore, the original 9 transported in a discharging direction thereof is discharged onto the originals 9 placed on the original tray 4 by the original discharging rollers *7a* and *7b*. A separating member 42 fixedly mounted on a belt 43 moves vertically inside of an opening portion 44 which is defined on the side surface of the original tray 4. The belt 43 is urged in a direction as shown by an arrow A in FIG. 2 by a driving device (not shown) so as to rotate the separating member 42 with rotation of the belt 43 along the outer peripheral surface thereof. A shutter 41 is arranged on the upper side of the opening portion 44 for controlling the movement of the separating member 42, when originals are placed on the original tray 4. After the originals have been placed on the original tray 4, the shutter 41 opens the opening portion 44 and so that the separating member 42 moves in a direction as shown by the arrow A with rotation of the belt 43. Since a driving force required for rotating the belt 43 is extremely small, the separating member 42 is brought to a standstill, when the separating member 42 comes in contact with the upper surface of the original placed on the original tray 4. When a copying operation is started, the originals 9 placed on the original tray 4 are transported one after another in the order from the lower original to the upper original, to the original platform 11 and each of the originals which has been subjected to the copying operation is discharged on the separating member 42. As the copying operation proceeds, the originals located under the separating member 42 are decreased in number thereof and after a last original has been supplied towards the original platform 11, the separating member 42 moves together with the belt 43 along the outer peripheral surface thereof which is not facing the original tray 4 so as to appear on the original tray 4 again. The originals placed on the original tray 4 can be known in circulation number thereof by detecting the separating member 42 at a portion of the outer periphery of the belt 43 which is not facing the original tray 4.

Referring now to flow-charts of FIGS. 3*a* through 3*e*, specific functionings for the automatic duplex copying machine described so far will be explained hereinafter.

The one-side copying operation will now be explained.

After a power source has been turned on, a copying magnification, the required number for copying, the number N of originals and the like are inputted at step n1. Upon depression of a print switch at step n2, it is judged whether or not the number N of originals is an even number. Where the number N of originals is an even number at step n3, a counter C for counting the number of supplied originals is cleared to zero at step n4. Subsequently, at step n5, the lowest one of originals which are placed on the original tray 4 of the circulatory document feeder 1 is supplied onto the original platform 11 and at this moment, 1 is added to the number represented in the counter C. At step n6, it is judged whether or not the number represented in the counter C is an even number, and where this number is an even number, that is, in case where the original on the original platform 11 is that of an odd page number, a copy paper sheet is supplied from a paper supplying portion such as a paper feed cassette or the like at step n7 and a copying operation is applied thereon. The copy paper sheet on which the copying operation has been applied is transported to the intermediate tray 22 at step n9 and thereafter, the procedure proceeds to step n10. At step n6, when the number represented in the counter C is an odd number, that is, in case where the original on the original platform 11 is that of an even page number, the procedure directly proceeds to step n10. At step n10, the original on the original platform 11 is discharged from the original recovering passage 37 of the circulatory document feeder 1 onto the originals 9 placed on the original tray 4. Thereafter, upon comparison of the number represented in the counter C with the number N of originals at step n11, the procedure proceeds to step n12 in case where the former is equal to the latter. Alternatively, when the former differs from the latter, the procedure returns to step n5 so as to repeat a process between steps n5 and n11.

The reverse-side copying operation will be explained hereinafter.

When the above described process has been completed on each of the originals, that is, when the number represented in the counter C has become equal to the number N of originals at step n11, it is judged whether or not the number N of originals is an even number at step n12 and at this moment, when this number N is an even number, the number represented in the counter C is cleared again to zero at step n13. Subsequently, an original is supplied onto the original platform 11 at step n14 and 1 is added to the number represented in the counter C. Thereafter, it is judged whether or not the counter C shows an odd number at step n15. At step n14, when the counter C shows an odd number, that is, when the original on the original platform 11 is that of an even page number, the one-side copied paper sheet stored on the intermediate tray 22 is transported to the copying process portion through the reversed paper transport passage 35 at step n15 so that a copying operation is applied on the reverse side thereof at step n17. It is judged whether or not a jamming has taken place at step n18, and when the jamming has not taken place, the double-side copied paper sheet is discharged to a bin 16 in the sorter 15 at step n19 and thereafter, the procedure proceeds to step n20. At step n15, when the counter C does not show an odd number, that is, when the original on the original platform 11 is that of an odd page number, the procedure directly proceeds to step n20. At step n20, the original placed on the original platform 11 is discharged on the original tray 4 through the original recovering passage 37. It is judged whether or not the number represented in the counter C is equal to the number N of originals at step n21, and where both numbers are not equal to each other, the procedure returns to step n14. Upon completion of the process between steps n14 and n21 on each of originals, in other words, when the number represented in the counter C has become equal to the number N of originals at step n21, the copying operation is over.

At step n3, when the number N of originals is an odd number, the procedure proceeds to step n22 whereat the original is supplied onto the original platform 11 from the circulatory document feeder 1. Subsequently, a copy paper sheet is supplied to the copying process portion from the paper supplying portion at step n23 so that a copying operation is applied thereon at step n24. Upon completion of copying operation, the one-side copied paper sheet is discharged to a bin 16 of the sorter 15 at step n25, and the original on the original platform 11 is also discharged on the original tray 4. Thereafter, the procedure returns to step n4 for conducting the aforementioned process.

Furthermore, when the number N of originals is an odd number at step n12, the original is directly discharged to the original tray 4 from the circulatory document feeder 1 at steps n27 and n28, without a copying operation being carried out. After the process at these steps, the procedure returns to step n13 for conducting the aforementioned process.

A treatment against jamming will be explained hereinafter.

When a jamming has taken place at step n18, the procedure proceeds to step n31. At step n31, a blank copy paper sheet is supplied from the paper supplying portion so that the original now placed on the original platform 11, that is, an image for the reverse side of one-side copied paper sheet which has been subjected to the jamming is copied on the blank copy paper sheet at step n32. Upon downward rotation of the one-side copied paper change-over claw member 83 at step n33, the one-side copied paper sheet on which an original having an image for the reverse side thereof has been copied, is led to the intermediate sub-tray 81. After the above described copying operation has been completed for an insufficient number of copied paper sheets, the original on the original platform 11 is discharged to the original tray 4 at step n34. At this moment, the original which has been led onto the original platform 11 is that of the preceding page having an image for the reverse side of the one-side copied paper sheet which has been subjected to the jamming, and is that corresponding to the front side of the copied paper sheet, on the reverse side of which the original stored on the intermediate sub-tray 81 has been copied. Accordingly, with respect to this original, the one-side copied paper sheet is supplied to the copying process portion from the intermediate sub-tray 81 at step n36, and upon copying operation thereon at step n37, the insufficient number of copied paper sheets on which the jamming has taken place can be replenished. Thereafter, the procedure returns to step n19 whereat the double-side copied paper sheet is discharged to the sorter 15, and the aforementioned process continues. In the above described process, step n33 corresponds to a one-side copied paper change-over means for one-side copied paper sheet according to the present invention and step n36 also corresponds to a one-side copied paper selecting means for selectively supplying a one-side copied paper sheet according to the same.

The copying operation in an interruption mode will be explained hereinafter.

In the case where an interruption mode is selected in such a operation as front-side copying operation or reverse-side copying operation at step n41, it is judged whether or not the original placed on the original platform 11 has been already copied in the required number at step n42. When the copying operation has been completed in the required number of the above described original at step n42, the original on the original platform 11 is discharged to the original tray 4. Subsequently, at step n44, originals are changed according to the interruption mode by operator, and data are inputted for the copying operation at step n45. Upon operation of the print switch at step n46, a copy paper sheet is supplied from the paper supplying portion at step n47 and the copying operation is carried out at step n48 in the interruption mode with respect to the original corresponding to the front side of the copy paper sheet. At step n49, the one-side copied paper change-over claw member 83 opens a transport passage towards the intermediate sub-tray 81 and the one-side copied paper sheet which has been applied with copying operation at step n48 is stored in the intermediate sub-tray 81. After the copying operation has been completed for the required number of the original, the original on the original platform 11 is discharged on the original tray 4 at step n50. At step n51, an original corresponding to the reverse side of one-side copied paper sheet is supplied on the original platform 11, and upon movement of the cam roller 82 at step n82, the one-side copied paper sheet stored on the intermediate sub-tray 81 is supplied to the copying process portion by the paper supplying roller 84. Subsequently, at step n53, the copying operation is carried out on the one-side copied paper sheet stored on the intermediate tray 22 for forming an image on the reverse side thereof, and at step n54, the double-side copied paper sheet having images on both sides thereof is discharged to a bin 16 in the sorter 15 which is not used. Thereafter, the original on the original platform 11 is discharged at step n55 and the double-side copying operation in the interruption mode is complete. In the above described process, step n49 corresponds to a one-side copied paper change-over means according to the present invention and step n52 also corresponds to a one-side copied paper selecting means for selectively supplying a one-side copied paper sheet according to the same.

It is to be noted that single-sided originals having more than three consecutive pages can be applied with automatic double-side copying operation in the interruption mode.

In addition, the present invention is applicable to a countermeasure against a jamming which has taken place in the reverse-side copying operation during the double-side copying process in the interruption mode, by arranging a plurality of intermediate sub-trays in the copying machine.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A method of treating a paper jam during a reverse-side copying operation for one-side copied paper sheets in a double-side copying process of an automatic duplex copying machine, wherein a copying operation is carried out on each of the originals having an odd page number during a first circulation of a plurality of one-sided originals placed on an original tray of a circulatory document feeder, and wherein each of the originals having an even page number is copied on the reverse side of each one-side copied paper sheet during a second circulation of said originals, with each of said one-side copied paper sheets being temporarily stored in an intermediate tray, said method comprising the steps of:

(a) carrying out a copying operation for an insufficient number of copied paper sheets by supplying copy paper sheets from a paper supplying portion with respect to the original having an even page number placed on an original platform which is to be copied on the reverse side of said one-side copied paper sheet;

(b) storing each one-side copied paper sheet according to the above described step in an intermediate sub-tray;

(c) supplying said one-side copied paper sheet from said intermediate sub-tray with respect to the original having an odd page number which is subsequently transported from said original tray for reverse-side copying operation on said one-side copied paper sheet; and (d) carrying out a copying operation on the reverse side of said one-side copied paper sheet.

2. An automatic duplex copying machine having means for forming images on both sides of a copy paper sheet, said copying machine comprising:

an original paper tray for supplying a plurality of originals to be copied to an original document table;

copy paper supply means for supplying a plurality of copy paper sheets to a copying station adjacent said original document table;

means for determining whether one of said plurality of originals fed to said original document table is an odd page number or, alternatively, an even page number;

means for copying said odd page number originals onto one side of said copy paper sheets during a first circulation of said plurality of originals;

means for temporarily storing said plurality of one-side copied papers in an intermediate tray;

means for reversing a paper transport direction of said plurality of one-side copied papers stored in said intermediate tray; and means for copying said even page number originals onto the reverse side of said plurality of one-side copied papers in a second circulation of said plurality of originals.

3. An automatic duplex copying machine according to claim 2, further comprising:

means for detecting and interrupting a paper jam during a reverse side copying of said plurality of one-side copied papers;

means responsive to said means for detecting a paper jam, for supplying a blank one of said plurality of copy paper sheets, wherein said even page number original is copied onto said blank copy paper sheet;

one-side copied paper changeover means for feeding said even page number original copied onto said blank copy paper sheet to an intermediate sub-tray, said original being subsequently discharged from said original platform back to said original tray;

means for copying a preceding odd-number page onto the front side of said one-side copied paper supplied from said intermediate sub-tray; and discharge means for discharging a double-side copied paper from said copying machine.

* * * * *